US008935454B2

(12) United States Patent
Nishimura

(10) Patent No.: US 8,935,454 B2
(45) Date of Patent: Jan. 13, 2015

(54) CONNECTORS TRANSMITTING/RECEIVING AN INPUT/OUTPUT SIGNAL AS A COMMUNICATION SIGNAL, COMMUNICATION HARNESS WITH THE CONNECTORS, AND THE COMMUNICATION SYSTEM WITH THE CONNECTORS

(75) Inventor: Masanobu Nishimura, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 229 days.

(21) Appl. No.: 13/580,085

(22) PCT Filed: Feb. 25, 2011

(86) PCT No.: PCT/JP2011/054264
§ 371 (c)(1),
(2), (4) Date: Aug. 20, 2012

(87) PCT Pub. No.: WO2011/105545
PCT Pub. Date: Sep. 1, 2011

(65) Prior Publication Data
US 2012/0327978 A1 Dec. 27, 2012

(30) Foreign Application Priority Data

Feb. 26, 2010 (JP) ................. 2010-043126

(51) Int. Cl.
*G06F 13/00* (2006.01)
*H04L 12/40* (2006.01)
*H04L 29/06* (2006.01)
*H01R 13/66* (2006.01)

(52) U.S. Cl.
CPC ........... *H04L 12/40032* (2013.01); *H04L 29/06* (2013.01); *H04L 12/40169* (2013.01); *H04L 2012/40215* (2013.01); *H04L 2012/40241* (2013.01); *H04L 2012/40273* (2013.01); *H01R 13/665* (2013.01); *H04L 69/18* (2013.01)
USPC ........................................... 710/316; 710/315

(58) Field of Classification Search
CPC ....................................................... H04L 29/06
USPC ................................................... 710/315, 316
See application file for complete search history.

(56) References Cited

U.S. PATENT DOCUMENTS 6,067,302 A 5/2000 Tozuka
2014/0133350 A1* 5/2014 Triess et al. ................... 370/254

FOREIGN PATENT DOCUMENTS

JP A-10-032883 2/1998
JP A-2005-348064 12/2005
(Continued)

OTHER PUBLICATIONS

Mar. 29, 2011 International Search Report issued in International Patent Application No. PCT/JP2011/054264.

*Primary Examiner* — Glenn A Auve
(74) *Attorney, Agent, or Firm* — Oliff PLC

(57) ABSTRACT

A connector for communication contains a connecting section, which is connected to communication line; and a network controller, which is connected internally to the connecting section, interprets a designated protocol and controls communication; and a transceiver, which makes possible transmission and receipt on the physical layer of the communication line.

13 Claims, 7 Drawing Sheets

(56) References Cited

FOREIGN PATENT DOCUMENTS

| JP | B2-3817855 | 9/2006 |
| JP | A-2007-203764 | 8/2007 |
| JP | B2-4028439 | 12/2007 |
| JP | A-2008-284943 | 11/2008 |

* cited by examiner

CONNECTORS TRANSMITTING/RECEIVING AN INPUT/OUTPUT SIGNAL AS A COMMUNICATION SIGNAL, COMMUNICATION HARNESS WITH THE CONNECTORS, AND THE COMMUNICATION SYSTEM WITH THE CONNECTORS

This application is the national phase under 35 U.S.C. §371 of PCT International Application No. PCT/JP2011/054264 which has an International filing date of Feb. 25, 2011 and designated the United States of America.

1. TECHNICAL FIELD

The example system described below relates to a communication system configured by connecting a plurality of communication devices through connectors for communication, and relates to a connector for communication that makes flexible response to various system configurations possible, communication harness and a communication system using the connectors.

2. BACKGROUND

In recent years, a system in which a plurality of communication devices, each assigned to a function, are connected together to mutually exchange data and to perform various processing in cooperation has been utilized in various fields. For example, in the field of the vehicle-mounted LAN (local area network), ECUs (electronic control units) have communication functions and mutually exchange data, each ECU performing a specialized processing, thereby realizing various functions as a system.

Moreover, as the functions that can be realized in an entire system tend to increase and be sophisticated, the amount and type of data transmitted between the communication devices tend to increase. At the same time, reduction in the cost and size of an entire system is required, and also reduction in the number of components and the size of each component is desired.

Communication protocols used between communication devices include not only IEEE1394 but, especially in the field of vehicles, CAN (Controller Area Network), MOST (Registered Trademark, hereinafter also referred to as "®") and FlexRay®. For sending and detecting a communication signal appropriate for these protocols, a communication device is provided with a transceiver that complies with a protocol in accordance with the type of a network connected to each communication device, i.e., data transmitted between communication devices. For example, a communication device for transmitting image data is provided with the IEEE 1394 transceiver appropriate for transmitting image data and a CAN transceiver for transmitting control signals. A communication device for transmitting high speed control signals is provided with a FlexRay transceiver.

Some systems without a fixed relation of connection between the communication devices or fixed functions of communication devices have flexible configurations that are adaptable to the requirements or specifications. Especially in the field of vehicles, even in the same model of vehicles, some communication devices may or may not be included in the system depending on the presence or absence of options. For example, a communication device with an option is connected to a device related to the option, while a communication device without the option is not connected to the device related to the option. It is commonly configured that one type of the communication device can be adopted to the various option configurations instead of making a physical configuration of each communication device different according to the presence or absence of options. Consequently, a connecting section (a transceiver) which is connected to the option-related device needs to be previously provided in a communication device regardless of whether the option is used or not. Particularly, the communication device where a protocol, such as the IEEE 1394 protocol, connects communication devices one-to-one, may be configured to have a device that may be "given away" or may not be used. Such communication device will be wasteful considering various options.

In view of reduction in size and the number of lines in systems, an invention has been proposed which relates to a connector with a built-in circuit board configured to have an intelligence function by including a circuit board inside of the connector that connects devices. For example, a configuration has proposed which enables a circuit board to be accurately positioned at a proper position when pushing it in and fixing it inside a connector housing.

SUMMARY OF THE INVENTION

A useless addition of an unnecessary port (transceiver) in each communication device in a communication system should be avoided to reduce the number of components, the number of lines in the system and the size of the system. The conventional technique, however, has not given consideration for a configuration to contain a communication function in order that the connector with a built-in circuit board can be applied to various communication systems between communication devices.

It is possible to avoid a useless addition of an unnecessary transceiver by applying the proposed configuration to mount the transceiver on the built-in circuit board in the connector. Unfortunately, simply mounting the transceiver on the built-in circuit board in the connector is not enough to avoid redundant configuration, because the communication device still needs a network controller function which inputs and outputs a signal to the transceiver in the connector based on a protocol appropriate for the transceiver.

In order to apply a communication device to various communication systems, a type of protocol on which the communication is based may depend on transmitted and received data. Such configuration will be redundant if the network controller function and an input/output terminal is included in the communication device. This is because each communication device needs to have the network controller function using a plurality of different protocols in order to make the common communication devices.

To make various communication systems possible, the configuration connected by a P2P as well as a bus needs to be realized. It is also desirable to respond flexibly to a configuration in which a communication line (a communication harness) can be additionally connected to a communication device.

An object of the example system described below is to provide a connector for communication that makes flexible response to various system configurations possible and that connect a communication device to a communication line, a communication harness containing the connector, and a communication system having the connectors.

According to the example embodiments, a communication device (an external device), being connected to a communication system, can realize communication by outputting a transmission instruction and accepting a reception without including a component section following a predetermined protocol or processing as a software. The communication device does not need to include a transmitting and receiving section (a transceiver) that outputs the communication signal on a physical layer according to the predetermined protocol and senses the signal sent to the communication line. Furthermore, the communication device does not need to output the signal to the transmitting and receiving section or interpret the signal received by the transmitting and receiving section based on a predetermined protocol. As these processing can be realized by the connector, a communication device can be configured without depending on the protocol of the system.

According to the example embodiments, the first communication section of the connector generates a communication signal based on a predetermined protocol in accordance with a communication by the predetermined protocol through a communication line in the second communication section, while the second communication section interprets a received signal based on a predetermined protocol, and notifying a communication device (external device) connected to the first communication section of data, independently from a protocol. This allows the configuration of the communication device connected to the connector in the example embodiments to be independent from protocols.

According to the example embodiments, the communication signal detected by the second communication section is transmitted to and received by the communication device while being transmitted to the outside so as to be further received by another device. Moreover, the connector is provided with the output terminal for outputting signals to the outside, so that the output terminal can be connected to another communication device to facilitate expansion.

According to the example embodiments, the connector is provided with the output terminal connected to another device (outside) at a surface opposite to the surface on which the connecting section for connection to the communication device. As the connector has a simplified and compact configuration, the entire communication system can be reduced in its size and weight, while various systems can easily be constructed.

According to the example embodiments, the connecting section to the communication device of the connector is a plug, which is connected to fit in a receptacle formed at the communication device, while the output terminal provided at a surface opposite from the connecting section is formed at the receptacle. This allows the communication device to be connected to the connector by fitting it in at the connecting section and to have a compact structure for mutual engagement with another circuit. It is thus possible for the communication system to easily have various configurations only by connecting the connector thereto.

According to the example embodiments, even with a configuration in which the communication device outputs an instruction for transmission by an arbitrary protocol and accepts a notice of reception, the communication is converted into the one in accordance with a predetermined protocol performed on a communication line connected by the connector. This allows each communication device also to utilize a mixture of communication devices compliant with various old and new protocols, independently from the communication compliant with a predetermined protocol. Thus, the communication device may be adaptable to different types of system configurations.

According to the example embodiments, the connector connected to a communication line is further connected to the relay connector connected to another communication line and internally including the relay processing circuit connected to a different communication line. The connecting section of the first communication section of the connector may be configured to be connected to the second connecting section of the relay connector, so that the data can be transmitted to/from the communication device at the first connecting section. By the use of the relay connector which is connected to be interposed between the connector and the communication device according to the example embodiments, data can be transmitted through different communication lines, without the need for an additional connector for connection to the relay device (GW: Gateway) on the communication line connected to the connector.

According to the example embodiments, in the case where the relay connector is connected between the communication device and the connector, the communication device and the connector as well as the plug and the receptacle are engaged to be connected with each other to achieve a compact configuration. This allows the communication system to easily have various configurations.

In the below example embodiments, the connector can implement processing based on the predetermined communication protocol on the physical and data link layers. Therefore, the connector does not need to have a function depending on these protocols. Accordingly, communication can be carried out only by an outputting data to be transmitted and accepting received data.

For an adaptation to a vehicle-mounted communication system, in particular, various arrangements of connection can be possible according to a model, a specification, a destination, and option and the like of a vehicle. Use of the connector of the example embodiment can flexibly respond to changes in the number of the communication device (ECU), thereby eliminating a giveaway of the connector to each ECU and waste of the harness.

Figure 1:
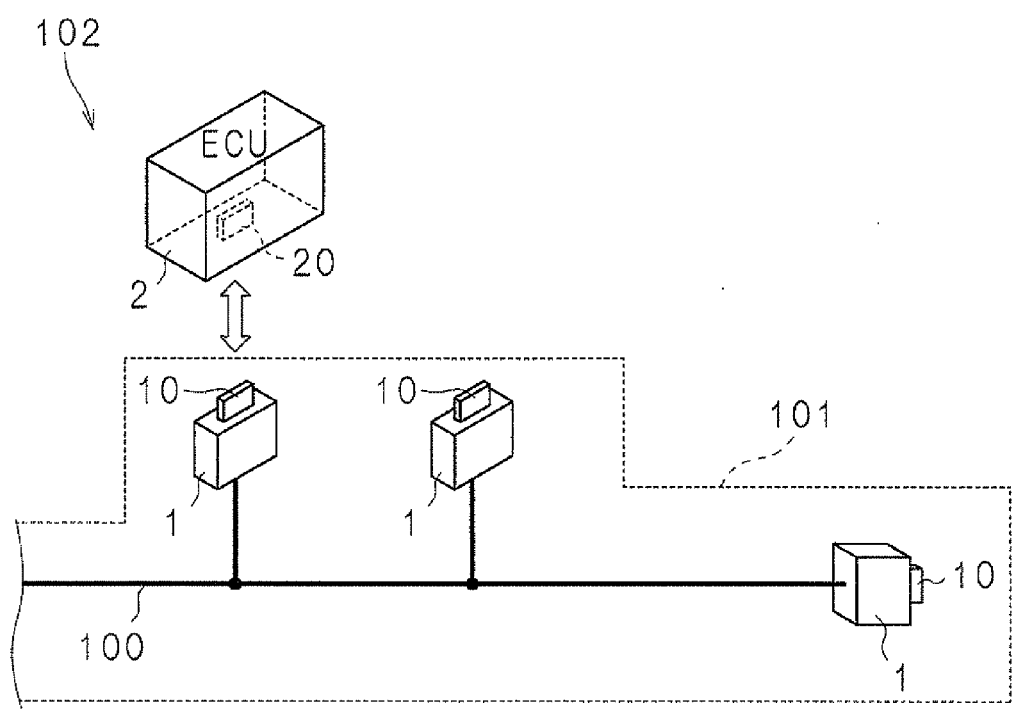
FIG. 1 is a configuration diagram schematically illustrating a configuration of a communication system including connectors for communication according to Embodiment 1.

EXPLANATION OF ITEM NUMBERS 1, 5, 7 connector (connector for communication)
10, 50, 70 connecting section
11, 51, 71 network controller
12, 52, 72 transceiver
73 connecting section (output terminal)
53 output terminal
100, 700 communication line 101 communication harness
102, 104, 105, 9 vehicle-mounted communication system
103, 702, 703 communication line
2 ECU
3 GW connector (relaying connector for communication)
30 connecting section
31 GW

DESCRIPTION OF EXAMPLE EMBODIMENTS

In the embodiments described below, an example will be described where connectors for communication are used for a vehicle-mounted communication system.

Embodiment 1

Figure 2:
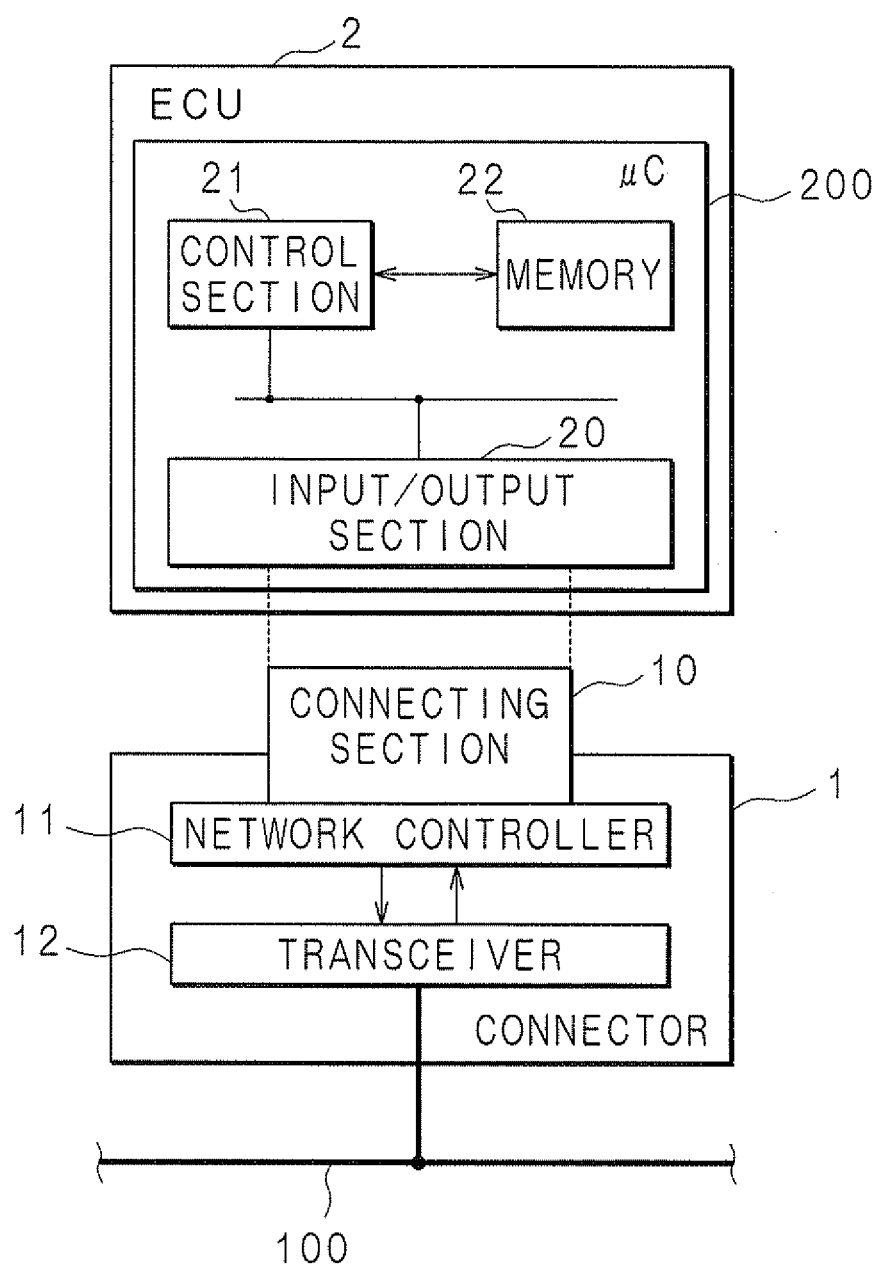
FIG. 2 is a block diagram illustrating the internal structure of the connector and an ECU forming the vehicle-mounted communication system according to Embodiment 1.

FIG. 1 is a configuration diagram schematically illustrating the configuration of a vehicle-mounted communication system 102 including connectors for communication according to Embodiment 1. FIG. 2 is a block diagram illustrating the internal structure of the connector and an ECU forming the vehicle-mounted communication system 102 according to Embodiment 1. The reference number 1 in FIG. 1 indicates a connector for communication including a connecting section 10 formed of a plug that is connected to be fit in a receptacle of an input/output section 20 in an ECU 2. A plurality of the connectors 1 connected to a communication line 100 are included in a communication harness 101 as shown in FIG. 1.

The ECUs 2, 2, . . . cooperate together by being connected to the connectors 1, 1, . . . respectively in the vehicle-mounted communication system 102. This allows the system 102 to realize various functions such as vehicle running control and sensor/actuator control related to a vehicle body.

The connector 1 has a substantially rectangular parallelepiped shape as shown in FIG. 1. The connector 1 has one surface from which an internally communication line 100 extends and a surface opposed to the above-described one surface provided with a plug-shaped connecting section 10 which is to be connected to the ECU 2.

Besides the connecting section 10, the connector 1 includes therein a network controller 11 and a transceiver 12.

The connecting section 10 includes a plug formed to be connected to the input/output section 20 in the ECU 2, as described later. The communication line from the network controller 11 is equipped inside of the connecting section 10.

The network controller 11 interprets a MOST® (Media Oriented Systems Transport) protocol, for example, and controls communication. In other words, the network controller 11 governs a data link layer of the MOST protocol. Particularly, the network controller 11 interprets a message instructing for a data transmission from a microcomputer (indicated as μC in the drawings) 200, which will be described later, in the ECU 2, generates a digital data signal based on the MOST protocol, and transmits the digital data signal to the transceiver 12. The network controller 11 interprets the digital signal output from the transceiver 12 based on the MOST protocol, retrieves data or message, and passes it to the microcomputer 200.

The network controller 11 may employ a network controller chip or ASIC. The network controller 11 may also be configured as software using a processor for executing a program.

It is understood that a communication protocol to which the network controller 11 conforms is not limited to MOST. It may be another protocol such as IEEE 1394, CAN (Controller Area Network), FlexRay®, or LIN (Local Interconnect Network). Accordingly, the communication line 100 may be a POF (Pipe Type Oil Filled) cable for MOST, a TP (Twisted Pair) cable for CAN or a cable for IEEE 1394.

Moreover, when a specific type of protocol is used for signal transmission between the network controller 11 and the input/output section 20 in the ECU 2, the network controller 11 may have a protocol converting function between the specified protocol and a communication protocol through the communication line 100. It may also have a buffering function for absorbing a difference in communication speed. The ECUs with different protocols or communication speeds can communicate with each other by connecting the connectors 1 to the ECUs performing communication with different communication protocols respectively. Consequently, a vehicle-mounted communication system in which old and new protocols are mixed can be realized.

The transceiver 12 generates a signal that follows the MOST protocol based on a digital signal sent from the network controller 11, and transmits it to the communication line 100. The transceiver 12 sends a signal detected from the communication line 100 to the network controller 11 as a digital signal. Here, the transceiver 12 governs a physical layer of the MOST protocol. Moreover, the transceiver 12 conforming to the CAN protocol transmits a differential signal to the communication line 100 based on the CAN signal sent from the network controller 11 and detects a difference in the electrical potentials in the communication line 100, and sends it as a digital signal to the network controller 11.

The ECU 2 includes a microcomputer 200 having the input/output section 20, a control section 21 and a memory 22. The ECU 2 controls various vehicle-mounted devices such as a sensor/actuator (not illustrated) mounted in a vehicle. The ECU 2 may include other component sections besides the microcomputer 200.

The input/output section 20 is a versatile interface of the microcomputer 200 and transmits and receives signals between the control section 21 described later and another component section or an external device. The input/output section 20, having a bus form, is established in a receptacle.

The control section 21 performs processing to control a vehicle-mount device based on a program (not illustrated) stored in a memory 22 using CPU (Central Processing Unit) or MPU (Micro Processing Unit). The control section 21 is connected to the input/output section 20 by an internal bus. The control section 21 transmits and receives a message (a digital signal) to and from another component section or an external device such as the connector 1 through the input/output section 20.

For the memory 22, a flash memory, EEPROM (Electrically Erasable and Programmable Read Only Memory) or DRAM (Dynamic Random Access Memory) is used. Particularly, the memory 22 includes the flush memory in which a program and control information referred by the control section 21 are stored, and the DRAM which temporarily stores information generated by the processing of the control section 21.

The ECU 2, for example, performs control processing using the information obtained from or calculated in another ECU 2 by transmitting and receiving data to and from another ECU 2 through the communication line 100. In this way, the ECU 2 works in cooperation with other ECUs 2 and can realize a various kinds of functions. By including the network controller 11 and the transceiver 12 in the connector 1 as described above, the control section 20 of the ECU 2 can transmit data regardless of the communication protocol type when passing data and a message for transmitting data to the connector 1. Accordingly, each ECU 2, 2, . . . does not need to depend on a protocol type and also a configuration of the microcomputer 200 can be a minimum merely using a versatile interface, thereby enabling reduction in the cost.

It is desired that the microcomputer in the ECU included in a vehicle-mounted communication system is configured to be able to respond to various communication protocols and to be switched so that it is adaptable to a various specifications. Such microcomputer is often expensive. The use of the connector 1 of the present Embodiment 1, however, enables the microcomputer to have minimum functions because the microcomputer may be independent from the communication protocol.

Moreover, the vehicle-mounted communication system 102 of a various connection configuration can be easily constructed since the ECUs 2, 2, . . . can be connected as needed using the communication harness 101 having the connector 1 and the communication line 100.

In Embodiment 1, an example of a communication harness 101 where more than three connectors 1, 1, 1 are bus connected thereto was described. In the embodiment, it is not limited to the above example. The harness may include of one communication line 100 and two connectors connected, respectively, to both ends of the communication line 100. This means a P2P connection between two ECUs 2, 2 can be applied as well as a bus connection, thereby realizing the P2P communication that transmits and receives a signal of an information system such as a picture signal or a sound signal in a vehicle-mounted communication system. Here, the ECU 2 can realize the transmission of data with another ECU 2 whether the P2P communication protocol is IEEE1394 or MOST.

Embodiment 2

Figure 3:
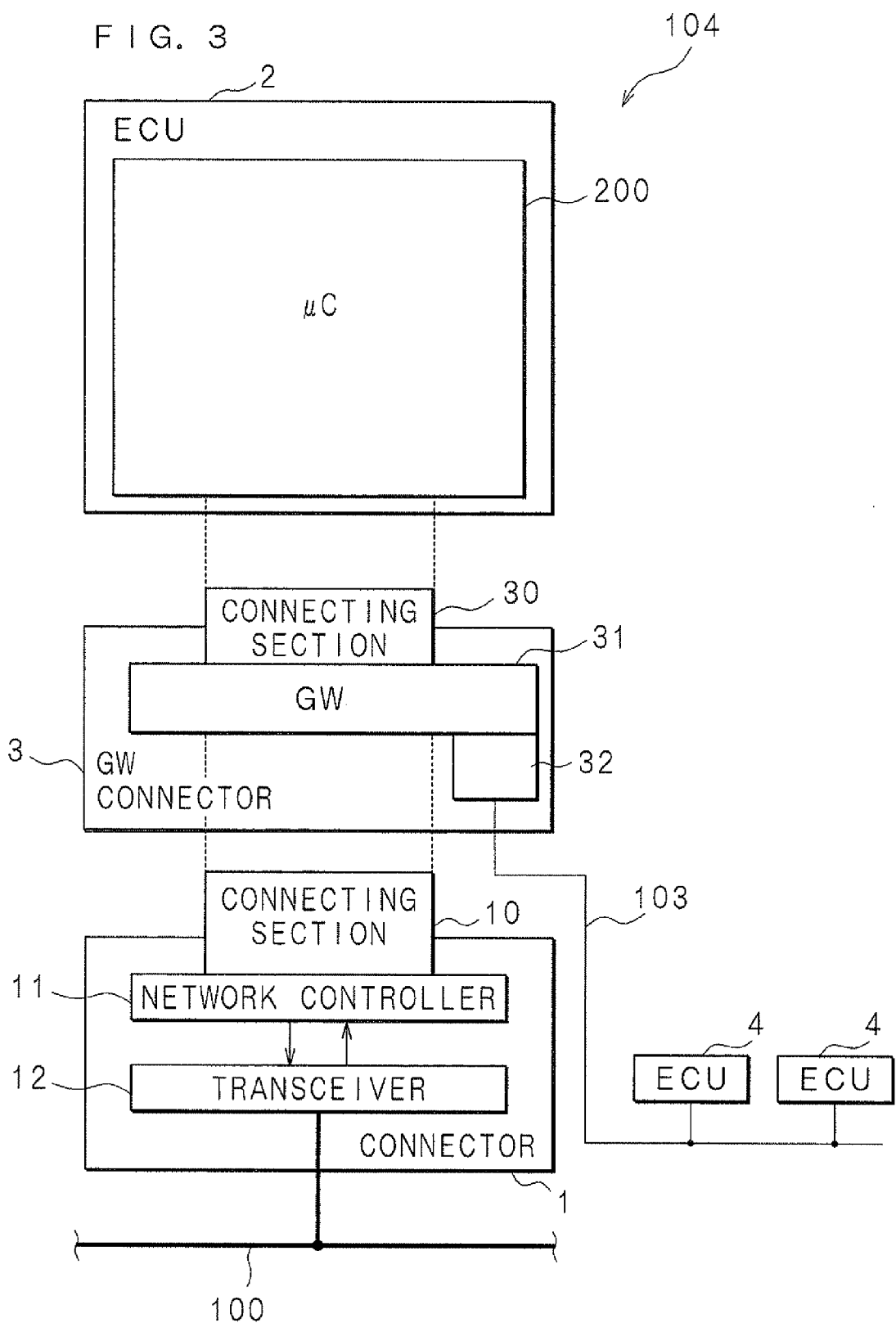
FIG. 3 is a block diagram illustrating the configuration of a vehicle-mounted communication system according to Embodiment 2.

In Embodiment 2, an example of a vehicle-mounted communication system is described in which a connector that contains a GW (Gateway) function for expanding a communication system is further included. FIG. 3 is a block diagram illustrating a configuration of a vehicle-mounted communication system 104 according to Embodiment 2. Since the configuration of the vehicle-mounted communication system 104 of Embodiment 2 is similar to that of the vehicle-mounted communication system of Embodiment 1, the same reference numbers are assigned to the common structures and the detailed explanation will not be repeated.

The reference number 3 in FIG. 3 indicates a GW (Gateway) connector having a relaying function. A communication line 103 that is different from a communication line 100 is connected to the GW connector 3. ECU 4, 4, . . . similar to the ECU 2 are connected to the communication line 103. The GW connector 3 is connected to be interposed between the connector 1 and the ECU 2. The GW connector 3 relays transmission of data among the ECU 2 connected to the GW connector 3 itself, the ECU 2, 2, . . . connected to the communication 100 through the connector 1, and the ECU 4, 4, . . . connected to the communication line 103 connected to the GW connector 3.

The GW connector 3 has a flat substantially rectangular parallelepiped shape and includes on one of its surfaces a plug-shaped connecting section 30 corresponding to a receptacle of the input/output section 20 in the ECU 2.

The GW connector 3 includes a GW 31 and a connecting section 32 as well as the connecting section 30.

The connecting section 30 is composed of a plug formed to connect with the input/output section 20 in the ECU 2, and is provided with a communication line from the GW 31 inside.

A connecting section 32 has functions of a network controller 11 and a transceiver 12. The connecting section 32 which is connected to the communication line 103 detects a signal transmitted to the communication line 103, interprets the signal based on the communication protocol on the communication line 103, retrieves data or message, and sends it to the GW 31.

The GW 31 is a circuit that performs a relaying process, and includes a receptacle in which the connecting section 10 in the connector 1 can fit. The GW 31 receives a digital signal from the connector 1 and a digital signal from the communication line 103 through the connecting section 32 separately. The digital signals correspond to data or message sent from the connector 1 and the communication line 103 respectively. The GW 31 determines if the communication signal needs to be relayed between the communication lines 100 and 103 that are different from each other based on the information that identifies a content of the signal. When the GW 31 determines the communication signal needs to be relayed, the GW 31 sends the digital signal to the connector 1 (or the connecting section 32) in order to transmit the digital signal to the communication line 100 (or 103). The GW 31, having a ROM (Read Only Memory) therein, stores a table which shows the relationship between identification information of the signal and the necessity of relaying for determining the necessity of relaying, and determines the necessity of relaying based on the table.

The configuration of Embodiment 2 can realize an expansion of the network and a relay between the communication lines 100 and 103 that are different from each other, simply by connecting the connector 1 and the ECU 2 with the GW connector 3 interposed in between without connecting a relay device having a casing like the ECU 2 through another communication line.

Here, the connecting section 32 has the functions of the network controller 11 and the transceiver 12. Moreover, data or message is input and output from the connecting section 10 in the connector 1 after it is interpreted based on the MOST protocol. Therefore, the GW 31 is versatile enough to be able to perform a relaying processing regardless of the protocol type of the communication line 100 and the communication line 103. Another configuration may be possible where the GW 31 has a function of the network controller 11 that interprets the protocol in the communication line 103 and the connecting section 32 performs the function of the transceiver 12.

Furthermore, the connecting section 32 can be configured to be detachable according to the protocol of the communication line 103. In other words, instead of the connecting section 32, another connector 1 may be connected to the communication line 103 connected the GW 31.

Embodiment 3

Figure 4:
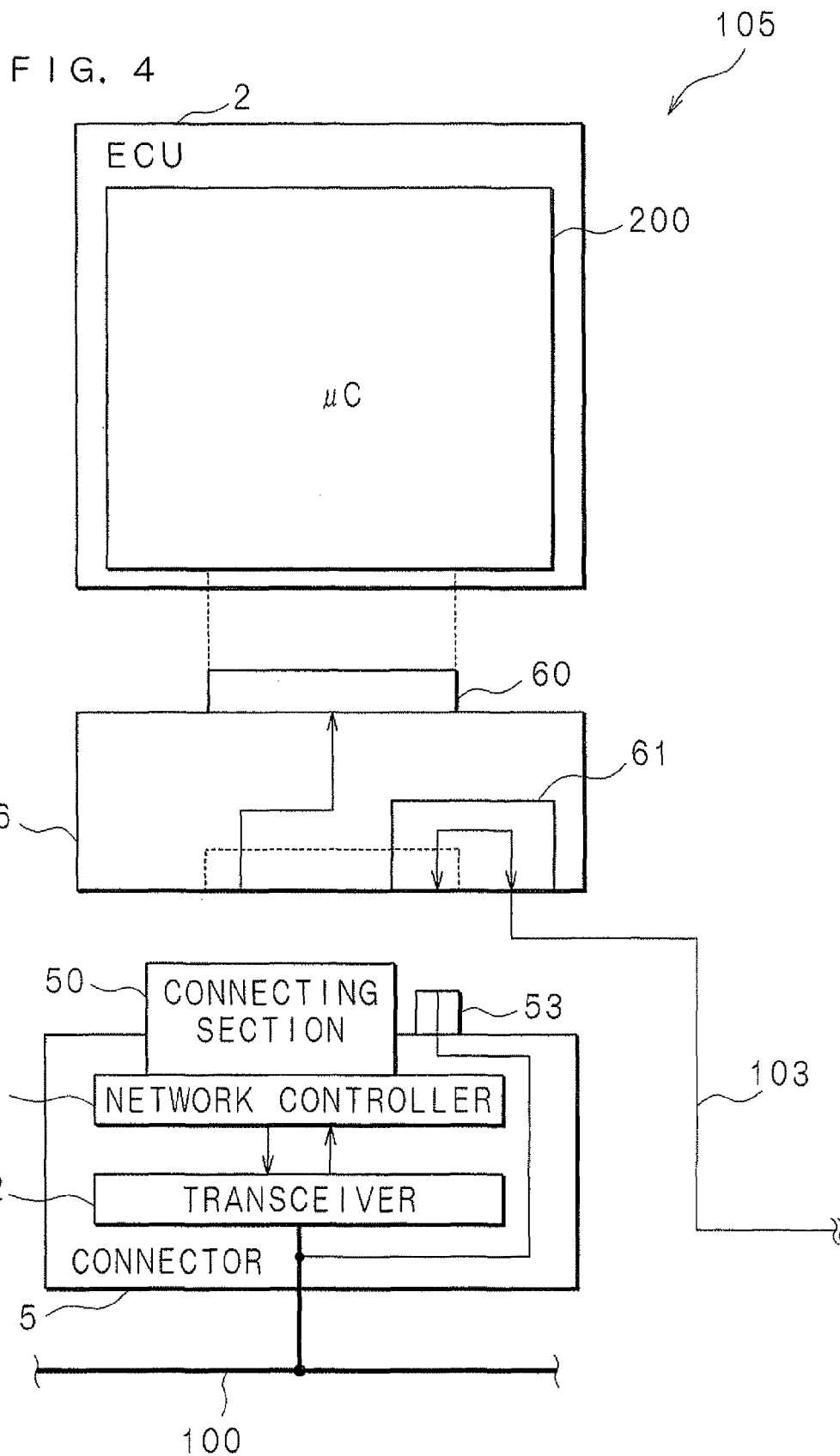
FIG. 4 is a block diagram illustrating the configuration of a vehicle-mounted communication system according to Embodiment 3.

In Embodiment 2, the connector 1 is configured to be connected to the ECU 2 with the GW connector 3 interposed in between. As the relaying function is not indispensable here, only a bus bar to branch the communication signal of the communication line 100 may be enough. FIG. 4 is a block diagram illustrating the configuration of a vehicle-mounted communication system 105 according to Embodiment 3. A configuration of the vehicle-mounted communication system 105 of Embodiment 3 is similar to that of the vehicle-mounted communication system of Embodiment 1 or 2, the same reference numbers are assigned to the common structures and the detailed explanation will not be repeated.

The reference number 5 in FIG. 4 indicates a connector for communication of Embodiment 3. The connector 5, having a shape similar to the connector 1 of the Embodiment 1, includes a network controller 51 and a transceiver 52 therein in addition to a connecting section 50. As the network controller 51 and a transceiver 52 have the same functions of those in the connectors of Embodiment 1 respectively, the detailed explanation will not be repeated.

The connectors 5 of Embodiment 3 includes a branch line branched from a communication line 100 therein, and an output terminal 53 that branches and outputs a communication signal transmitted to the communication line 100. The output terminal 53 is a plug provided in parallel with a connecting section 50. The connecting section 50 and the output terminal 53 can be fit in a bus bar 6, described later, or a receptacle of an input/output section 20 in an ECU 2.

The reference number 6 in FIG. 4 indicates a bus bar to which a communication line 103 is connected. The bus bar 6 is connected to be interposed between the connectors 5 and the ECU 2. The bus bar 6 connects the connecting section 50 of the connector 5 and the input/output section 20 in the ECU 2, when connected to the connector 5 and the ECU 2. Here, a signal line or a communication line is mounted on a board of the bus bar 6 in order to connect the output terminal 53 on the connector 5 and the communication line 103. Another possible configuration may include a terminal block that connects the output terminal 53 and the communication line 103 while connecting the connecting section 50 and the input/output section 20.

In the configuration as in Embodiment 3, a communication signal transmitted to the communication line 100 is branched, and the communication line 100 and the communication 103 can be expanded as one network. This enables a system to expand by a simple operation without including an expansion connector in the communication harness in advance, which may or may not be used.

The connector 5 of Embodiment 3 is connected to the ECU 2 through the bus bar 6. In the embodiment, this is not limited to the above example. The connector 5 may be configured to be connected to the ECU 2 directly. In this case, the function of microcomputer 200 in the ECU 2 makes it possible to detect whether there is a failure inside of the connector 5 by sensing a signal on the communication line 100 without interpreting the protocol. For example, the microcomputer 200 can be configured to determine that an error is occurring in the connector 5, if it does not receive a digital signal of data or message received from the connector 5 in spite that a communication line 100 senses a signal.

Embodiment 4

Figure 5:
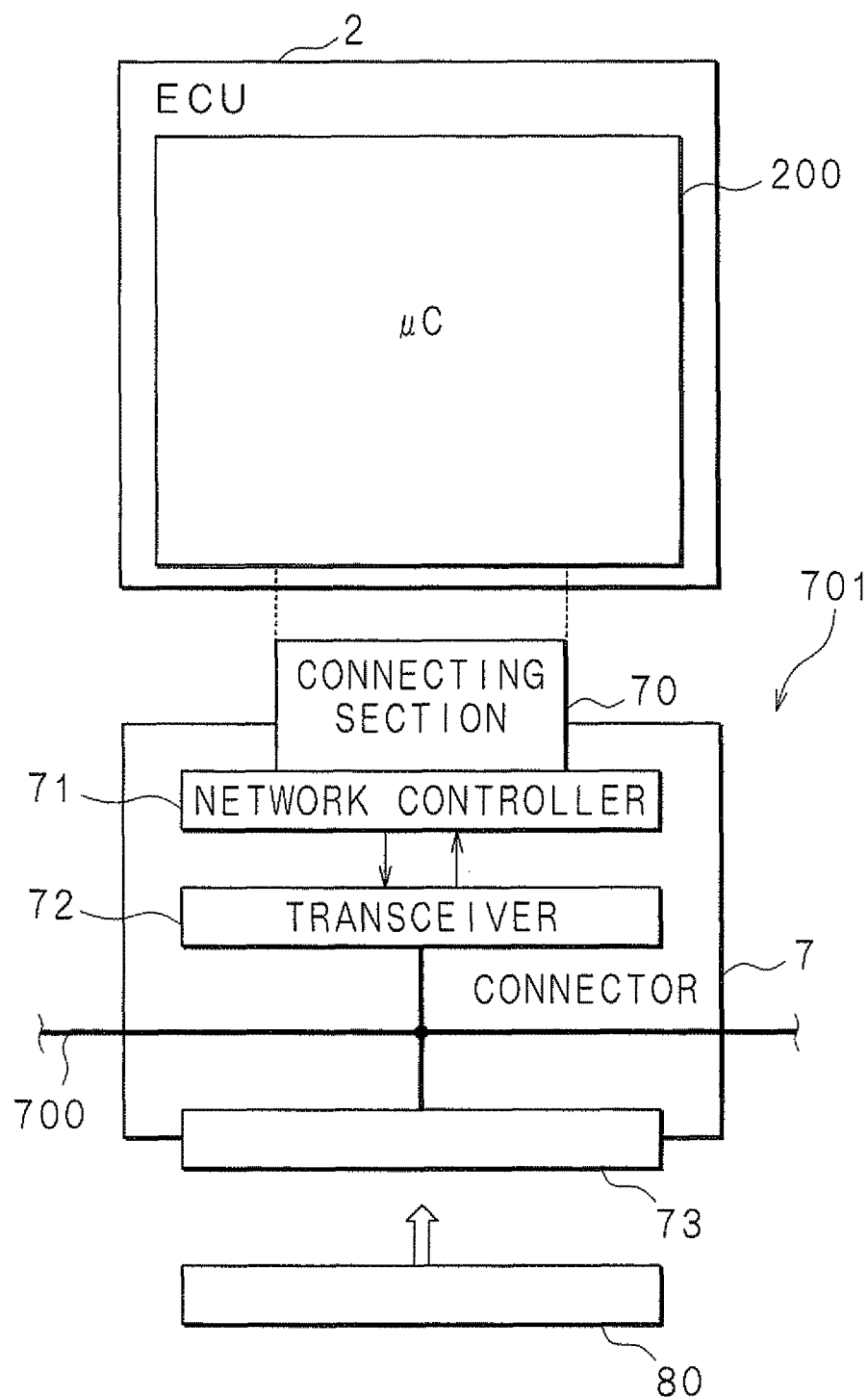
FIG. 5 is a block diagram illustrating the configuration of a vehicle-mounted communication system according to Embodiment 4.

FIG. 5 is a block diagram illustrating the configuration of a vehicle-mounted communication system according to Embodiment 4. As the configuration of the vehicle-mounted communication system 105 of Embodiment 3 is similar to that of the vehicle-mounted communication system of Embodiment 1 and 2, the same reference numbers are assigned to the common structures and the detailed explanation will not be repeated.

The reference number 7 in FIG. 5 indicates a connector for communication of Embodiment 4. The connector 7, having a shape similar to the connector 1 of the Embodiment 1, internally includes a network controller 71 and a transceiver 72 to which a communication line 700 is connected, in addition to a connecting section 70. As the network controller 71 and the transceiver 72 have the same functions of those in a connector for communication of Embodiment 1 respectively, the detailed explanation will not be repeated.

The connectors 7 further includes a connecting section 73 on a surface opposite to the one on which the connecting section 70 is provided. The connecting section 73, like the output terminal 53 of Embodiment 3, is configured to branch a communication signal output to the communication line 700 and is arranged in a receptacle. The network can be expanded by further connecting another connector 7 to the connecting section 73.

The reference number 80 in FIG. 5 indicates an expansion circuit. The expander circuit 80 may be a termination circuit with a plug corresponds to the connecting section 73 in the connecting section 7, is connected to fit in the connecting section 73 in the connector 7. Alternatively, the expander circuit 80 may be a filter circuit for eliminating noise in the communication line 700. A bus connection is formed in a communication harness 701 that includes the communication line 700 and the connector 7 having the connecting section 73 connected to the expander circuit 80. The expander circuit 80 is an electrical circuit that improves a signal characteristic of the termination circuit or the filter circuit. The expander circuit 80 is connected to the connecting section 73 to be arranged at any appropriate position so that the electrical characteristic of the signal fulfills a desired characteristic in accordance with the length of the harness or the state of branches. A plurality of the connectors 7 may be connected to the communication line 700 on the communication harness 701. Such configuration of the communication harness 701 allows a physical expansion of the various connections in a bus, and also enables the electric characteristic of the signal in communication to fulfill the desired characteristic by connecting the expander circuit 80. Particularly in the vehicle-mounted communication system, such configuration can respond to the communication harness that changes its form in accordance with an optional device mounted in a vehicle, and can appropriately set the expander circuit 80 at minimum required positions, thus efficiently improving the electrical characteristics of the signal.

Thus, configuring the communication harness 701 that includes the communication line 700 connected to the connector 7 of Embodiment 4 can construct a vehicle-mounted communication system that can be expanded by a simple operation of connecting the ECUs 2, 2, . . . .

Figure 6:
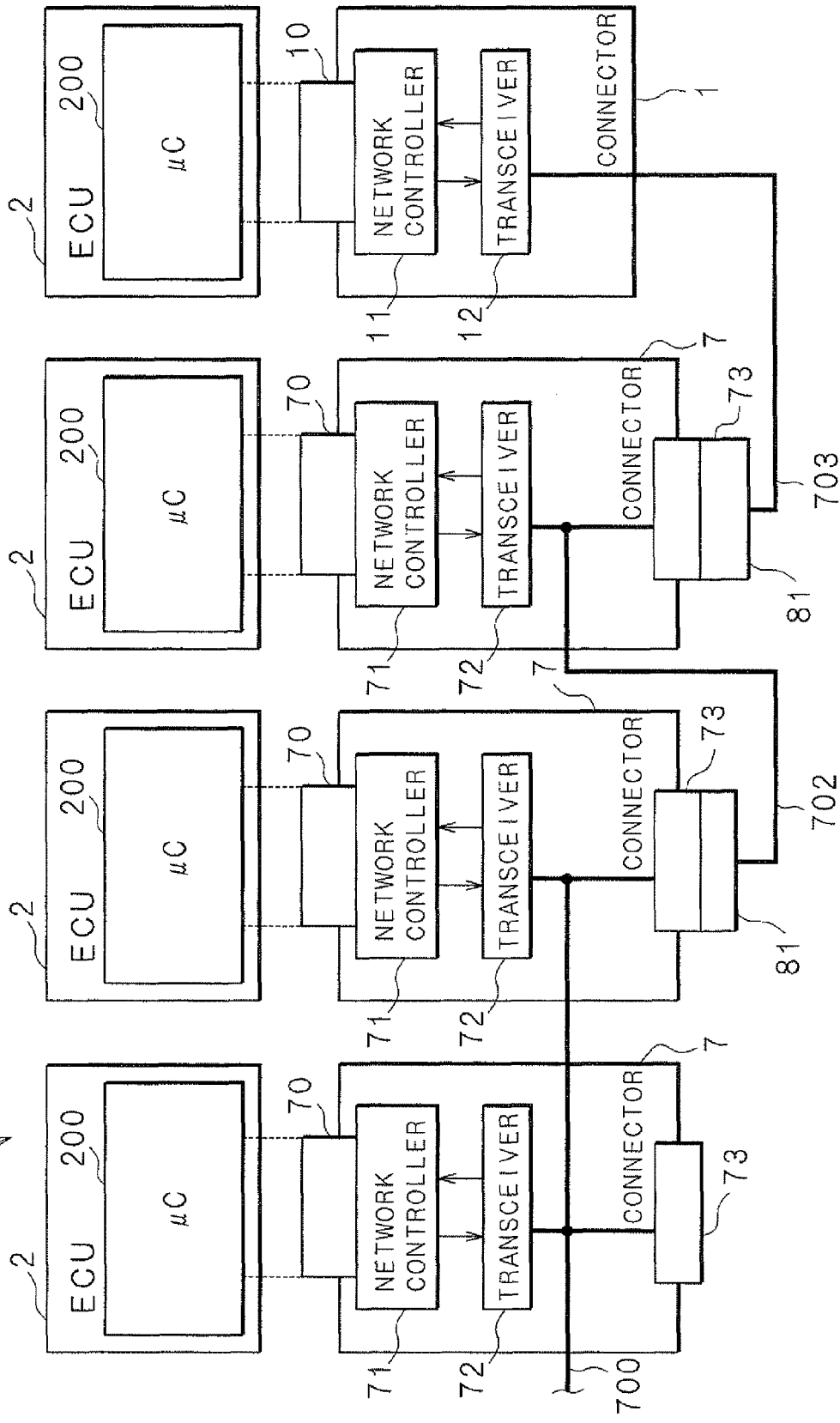
FIG. 6 is a block diagram illustrating the configuration of a vehicle-mounted communication system extended by utilizing connectors for communication according to Embodiment 4.

FIG. 6 is a block diagram illustrating the configuration of a vehicle-mounted communication system 9 extended by utilizing the connector 7 according to Embodiment 4.

Figure 7:
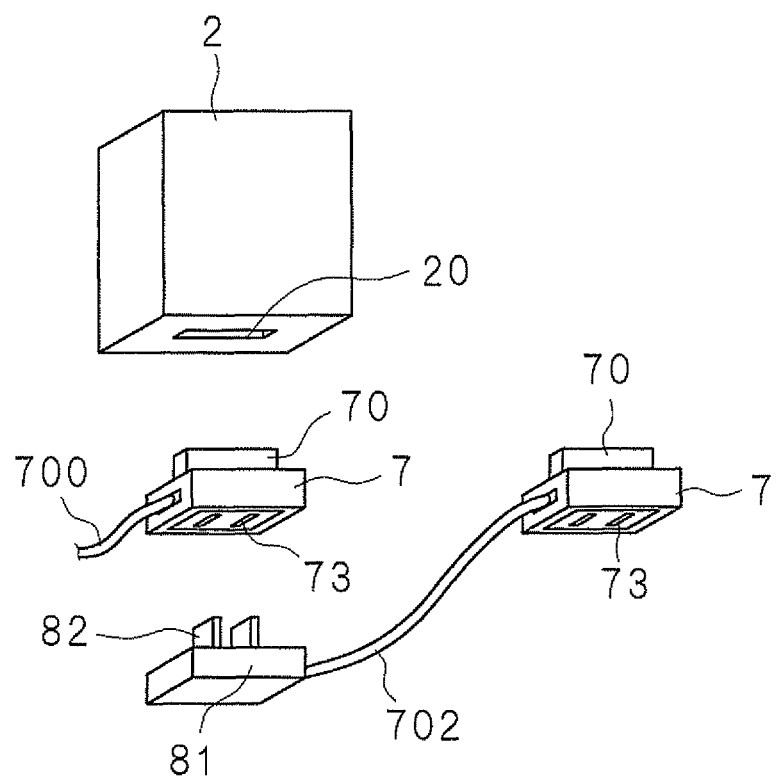
FIG. 7 is a perspective view schematically illustrating an external appearance of the connector.

FIG. 7 is a perspective view schematically illustrating an external appearance of a part of the vehicle-mounted communication system of Embodiment 4.

The vehicle-mounted communication system 9 shown in FIG. 6 and FIG. 7 includes two connectors 7, 7 connected to the communication line 700 and the ECU 2 connected to each of two connectors 7, 7 respectively. The system including the communication line 700, two connectors 7, 7 and the ECUs 2, 2 corresponds to standard equipment.

When the system corresponding to standard equipment needs to be expanded by connecting the ECU 2 that realizes a specific function according to an option, it can be realized by connecting an additional connector 7 to the connector 7 connected to the end of the communication line 700.

The additional connector 7 is connected to the communication line 702 through the internal transceiver 72 and the connecting section 73. The communication line 702 is connected to an expansion connector 81 having a plug 82 for an expansion. The system can be expanded by connecting the plug 82 of the expansion connector 81 to the connecting section 73 of the connector 7 which is an end part of the system in correspondence with standard equipment. The expansion connector 81 transmits the communication signal of the communication line 700 to the communication line 702, the communication signal being branched and output from the connecting section 73 connected through the plug 82. As shown in FIG. 7, the expansion connector 81 can be easily connected to the connector 7 simply by connecting the plug 82 to be inserted to the connector 7.

When the system expanded in this way needs to be further expanded by connecting to the ECU 2 that enables the specific function according to the option or model of the vehicle, it can be realized by connecting a further connector 1 to the connector 7 connected through the communication line 702.

Thus, the connector 1 without the connecting section for an expansion described in Embodiment 1 may be utilized for an expansion. In FIG. 6, the connector 1 is connected to the connector 7 to which the communication line 702 is connected. The connector 1 included in the vehicle-mounted communication system 9 is connected to the expansion connector 81 with the plug 82 for an expansion through the communication line 703. The system can be further expanded by connecting the plug 82 of the expansion connector 81 to the connecting section 73 of the connector 7 connected to the communication line 702, and thus the vehicle-mounted communication system 9 as shown in FIG. 6 can be constructed.

The expansion connector 81 connected to the connector 1 further branches the communication signal of the communication line 702 branched and output from the connecting section 73 connected through the plug 82, and transmits the communication signal to the communication line 703.

As described in Embodiments 1 through 4, the connector (1, 5 or 7) realizes processing based on the communication protocol. Therefore, the ECU 2 using any communication protocols can have a common configuration without depending on a protocol. Also, the ECU 2 does not need to be provided with a microcomputer that can respond to the network controller following various communication protocols. Thus, its configuration can be realized at a low cost.

Moreover, as described in Embodiments 1 through 4, an expansion operation by adding a new ECU 2 can be easily realized. As described in Embodiment 4, in the system in correspondence with standard equipment, there is no need additionally to connect a network controller that may not be used, a connector with a transceiver and a harness, avoiding waste. Also, flexible response to various connecting configurations may be possible according to a model, a specification, a destination, and option and the like of the vehicle.

The connecting section 10 (, 50, 70 or 73) in the connector 1 (, 5 or 7) in Embodiments 1 through 4 is not limited to the configuration in which the signal line that is internally provided by fitting therein is in contact with the signal lines in the input/output section 20 to input and output the signal. Even if the connecting section 10 is configured to be physically fit in the input/output section 20, the internally contained signal line may be configured to input and output (communicate) a signal by near field wireless transfer without being in contact with the connecting section 10.

The invention claimed is:

1. A connector for communication, comprising:
a connecting section to an external device;
a communication control section connected to the connecting section; and
a transmission/reception section connected to the communication control section and a communication line, for transmitting or receiving a communication signal, wherein
the communication control section comprises:
a data accepting unit for accepting data to be transmitted via the connecting section; and
a data output unit for outputting data indicated by the received communication signal to the connecting section, and
the transmission/reception section comprises:
a sending unit for sending a communication signal based on the data accepted by the data accepting unit;
a detection unit for detecting a communication signal transmitted to the communication line; and
a first signal output unit for outputting a communication signal detected by the detection unit to the communication control section.

2. The connector for communication according to claim 1, wherein
the communication control section further comprises:
a generation unit for generating a communication signal including the data accepted by the data accepting unit, based on a predetermined protocol;
a second signal output unit for supplying a communication signal generated by the generation unit to the transmission/reception section; and
a data obtaining unit for interpreting the communication signal output from the first signal output unit of the transmission/reception section based on the predetermined protocol to obtain data, wherein
the data output unit is configured to send the data obtained by the data obtaining unit to the external device.

3. The connector for communication according to claim 1, further comprising:
a branch section for branching a communication signal detected by the transmission/reception section; and
an output terminal for outputting a communication signal obtained after branching the communication signal by the branch section.

4. The connector for communication according to claim 3, further comprising a casing having a substantially rectangular parallelepiped, wherein
the connecting section is provided at one surface of the casing, and
the output terminal is provided at a surface opposite to said one surface.

5. The connector for communication according to claim 4, wherein
the connecting section is a plug, and
the output terminal is provided at a receptacle.

6. The connector for communication according to claim 1, wherein
the communication control section performs a protocol conversion between a data communication through the connecting section and a communication based on a predetermined protocol.

7. The connector for communication according to claim 1, wherein
the connection section inputs and outputs data through near-field wireless transfer to and from the external device.

8. A connector for communication, comprising:
a first connecting section to an external device;
a second connecting section connected to a communication line; and
a relay processing circuit to be connected to another connector connecting another communication line, for determining whether or not relay of data or a communication signal is required among the first connecting section, the second connecting section and said another connector, and for specifying a relay destination.

9. The connector for communication according to claim 8, wherein
the second connecting section further comprises:
a detection unit for detecting a communication signal transmitted to said communication line;
a data output unit for outputting data indicated by the communication signal detected by the detection unit to the first connecting section or another connector; and
a sending unit for sending a communication signal based on data output by the first connecting section or another connector to said another communication line.

10. A communication harness, comprising:
one or more connectors for communication; and
a communication line connected to said one or more connectors through a bus, wherein
the connector further comprises:
a connecting section to an external device;
a communication control section connected to the connecting section; and
a transmission/reception section connected to the communication control section and the communication line for transmitting or receiving a communication signal, wherein
the communication control section comprises:
a data accepting unit for accepting data to be transmitted, through the connecting section; and
a data output unit for outputting data indicated by the received communication signal to the connecting section, and
the transmission/reception section comprises:
a sending unit for sending a communication signal based on data accepted by the data accepting unit to the communication line;
a detection unit for detecting the communication signal sent to the communication line; and
a signal output unit for outputting the communication signal detected by the detection unit to the communication control section.

11. A communication system, comprising:
one or more connectors for communication;
a communication line connected to said one or more connectors through a bus; and
a plurality of communication devices for transmitting data, wherein
a part or all of the plurality of communication devices is/are connected to the communication line through the connector, while any remaining communication devices are connected to the communication line,
at least one of the plurality of communication devices comprises:
an output section for outputting an instruction for data to be transmitted; and
an accepting section for accepting data for a reception signal, and
the connector for communication further comprises:
a connecting section to the communication device;
a communication control section connected to the connecting section; and
a transmission/reception section connected to the communication control section and the communication line for transmitting or receiving a communication signal, wherein
the communication control section comprises:
a data accepting unit for accepting data to be transmitted from the communication device to another communication device; and
a data output unit for sending data indicated by the communication signal received from another communication device to the communication device, and
the transmission/reception section comprises:
a sending unit for sending a communication signal based on the data accepted by the data accepting unit to the communication line;
a detection unit for detecting a communication signal transmitted to the communication line; and
a signal output unit for outputting a communication signal detected by the detection unit to the communication control section.

12. A communication system, comprising:
one or more connectors for communication;
a communication line connected to said one or more connectors through a bus;
a plurality of communication devices for transmitting data;
another communication line different from the communication line; and
a relay connector for communication connected to another communication line; wherein
a part or all of the plurality of communication devices comprises:
an output unit for outputting an instruction for data to be transmitted; and
an accepting section for accepting data for a reception signal,
a part or all of the plurality of communication devices is/are connected to the communication line through the relay connector and the connector, while any remaining communication devices are connected to said another communication line,
the connector further comprises:
a connecting section to the relay connector;
a communication control section connected to the connecting section; and
a transmission/reception section connected to the communication control section and the communication line for transmitting or receiving a communication signal, wherein
the communication control section comprises:
a data accepting unit for accepting data to be transmitted to the communication line; and
a data output unit for outputting data indicated by a communication signal received from the communication line, and
the transmission/reception section comprises:
a sending unit for sending a communication signal based on the data accepted by the data accepting unit to the communication line;
a detection unit for detecting a communication signal sent to the communication line; and
a signal output unit for outputting the communication signal detected by the detection unit to the communication control section, and
the relay connector comprises:
a first connecting section to the communication device;
a second connecting section connected to another communication line; and
a relay processing circuit for determining whether or not relay of data or a communication signal is required among the first connecting section, the second connecting section and another connector, and for specifying a relay destination.

13. The communication system according to claim 12, wherein
- the plurality of communication devices further comprises a receptacle for inputting and outputting data,
- the first connecting section of the relay connector comprises a plug corresponding to the receptacle,
- the connecting section of the connector is a plug for inputting and outputting data, and
- the relay processing circuit comprises a receptacle corresponding to the plug.

* * * * *